US012649420B2

(12) United States Patent
Kwon et al.

(10) Patent No.: US 12,649,420 B2
(45) Date of Patent: Jun. 9, 2026

(54) VEHICLE SIDE-VIEW MIRROR SYSTEM

(71) Applicants: HYUNDAI MOTOR COMPANY, Seoul (KR); KIA CORPORATION, Seoul (KR); SL Mirrortech Corporation, Siheung-si (KR); SL Corporation, Daegu (KR)

(72) Inventors: Tae Hyung Kwon, Hwaseong-si (KR); Hyuk Jekal, Hwaseong-si (KR); Ik Soo Jang, Hwaseong-si (KR); Young Su Nam, Daegu (KR); Yong Hwan Kim, Gyeongsan-si (KR); Young Kuk Jo, Daegu (KR); Eun Jun Song, Yongin-si (KR); Byoung Ki Ji, Daegu (KR)

(73) Assignees: HYUNDAI MOTOR COMPANY, Seoul (KR); KIA CORPORATION, Seoul (KR); SL Mirrortech Corporation, Siheung-si (KR); SL Corporation, Daegu (KR)

( * ) Notice: Subject to any disclaimer, the term of this patent is extended or adjusted under 35 U.S.C. 154(b) by 0 days.

(21) Appl. No.: 18/923,378

(22) Filed: Oct. 22, 2024

(65) Prior Publication Data

US 2025/0353434 A1      Nov. 20, 2025

(30) Foreign Application Priority Data

May 14, 2024      (KR) ........................ 10-2024-0063478

(51) Int. Cl.
B60R 1/12 (2006.01)
B60Q 1/26 (2006.01)
(Continued)

(52) U.S. Cl.
CPC ............ *B60R 1/1207* (2013.01); *B60Q 9/008* (2013.01); *B60R 1/06* (2013.01);
(Continued)

(58) Field of Classification Search
CPC .. B60Q 1/2665; B60Q 1/5035; B60Q 1/5037; B60Q 3/217; B60Q 3/78; B60Q 9/006;
(Continued)

(56) References Cited

U.S. PATENT DOCUMENTS

2019/0168666 A1* 6/2019 Nomura ................. B60Q 3/283
2020/0039440 A1* 2/2020 Ozawa ................ B60R 11/0223
(Continued)

FOREIGN PATENT DOCUMENTS

DE        102011106838 B4 * 11/2019   .......... B60Q 1/2665
FR            3056537 A1 *  3/2018   .............. B60Q 3/78
JP          2019101883 A  *  6/2019

OTHER PUBLICATIONS

Machine translation of JP 2019101883 A retrieved from the FIT database of PE2E search. (Year: 2025).*

(Continued)

*Primary Examiner* — Colin J Cattanach
(74) *Attorney, Agent, or Firm* — Lempia Summerfield Katz LLC

(57) ABSTRACT

A vehicle side-view mirror system includes: a side-view camera disposed on the exterior of a vehicle; and a display assembly mounted on an interior trim of a vehicle door. In particular, the display assembly includes a lamp module configured to be turned on as another vehicle approaching the vehicle is detected, and a display module configured to display an image captured by the side-view camera.

12 Claims, 13 Drawing Sheets

(51) Int. Cl.

| | |
|---|---|
| *B60Q 1/50* | (2006.01) |
| *B60Q 3/217* | (2017.01) |
| *B60Q 3/78* | (2017.01) |
| *B60Q 9/00* | (2006.01) |
| *B60R 1/04* | (2006.01) |
| *B60R 1/06* | (2006.01) |

(52) U.S. Cl.
CPC ...... *B60K 2360/179* (2024.01); *B60Q 1/2665* (2013.01); *B60Q 1/5035* (2022.05); *B60Q 1/5037* (2022.05); *B60Q 3/217* (2017.02); *B60Q 3/78* (2017.02); *B60Q 9/006* (2013.01); *B60Q 9/007* (2013.01); *B60R 1/04* (2013.01); *B60R 2001/1253* (2013.01); *B60R 2300/802* (2013.01); *B60R 2300/8026* (2013.01); *B60R 2300/804* (2013.01); *B60R 2300/8066* (2013.01); *B60R 2300/8086* (2013.01)

(58) Field of Classification Search
CPC ............ B60Q 9/007; B60R 2001/1253; B60R 2300/00–8093; B60R 1/04; B60K 2360/179

See application file for complete search history.

(56) References Cited

U.S. PATENT DOCUMENTS

| | | | | |
|---|---|---|---|---|
| 2021/0107400 A1* | 4/2021 | Erler | ...................... | H03K 17/96 |
| 2022/0402431 A1* | 12/2022 | Seegers | ................. | B60Q 3/217 |
| 2025/0074311 A1* | 3/2025 | Sobecki | .............. | H05B 47/125 |

OTHER PUBLICATIONS

Machine translation of FR 3056537 A1 retrieved from the FIT database of PE2E search. (Year: 2025).*
Machine translation of DE 102011106838 B4 retrieved from the FIT database of PE2E search. (Year: 2025).*

* cited by examiner

VEHICLE SIDE-VIEW MIRROR SYSTEM

CROSS-REFERENCE TO RELATED APPLICATION

This application claims the benefit of and priority to Korean Patent Application No. 10-2024-0063478, filed on May 14, 2024, in the Korean Intellectual Property Office, the entire contents of which are incorporated herein by reference.

TECHNICAL FIELD

The present disclosure relates to a vehicle side-view mirror system, and more particularly, to a vehicle side-view mirror system designed to visually and accurately provide a driver with information of an approaching vehicle.

BACKGROUND

In general, a vehicle includes side-view mirrors provided on the exterior of the vehicle and designed to help a driver see the sides and rear of the vehicle in the driver's blind spots.

In recent years, digital side-view mirror systems have been released. The digital side-view mirror system may include a side-view camera that is mounted on the exterior of the vehicle, and a display that displays an image captured by the side-view camera. The digital side-view mirror system may provide the driver with a clear side and rear view both day and night, while minimizing the driver's blind spots by increasing the vehicle's field of view on the sides and rear of the vehicle.

The digital side-view mirror system may be configured to display a plurality of auxiliary lines on the display depending on a distance (12 m, 3 m, etc.) to another vehicle approaching from the next lane according to the operation of a turn signal while the vehicle is changing lanes. In addition, the digital side-view mirror system may be configured to display a warning image on the display when another vehicle approaches from the next lane. Furthermore, the digital side-view mirror system may be configured to display the width of the vehicle and the distance (1 m, 0.5 m, etc.) to the vehicle behind on the display when a reverse gear is engaged while parking or backing up.

However, the digital side-view mirror system according to the related art may display a 2D image on the display, making it difficult for the driver to realistically perceive the distance. In other words, since 3D surroundings of the driving vehicle are displayed on the display (i.e., a 2D plane), it may be difficult to accurately convey the spatial depth and size of the vehicle's actual surroundings. As a result, the conventional digital side-view mirror system may make it difficult to sense the speed of a following vehicle, detect an obstacle in a blind spot during the parking of the vehicle, and perceive a distance to the vehicle behind during the lane change of the vehicle.

In addition, the conventional digital side-view mirror system may be configured to display a blind-spot collision warning (BCW) image at one corner of the display when the vehicle changes lanes. However, as the BCW image is displayed on the relatively small-sized display, it may be difficult for the driver to easily recognize the BCW image.

Furthermore, brightness of the display in the conventional digital side-view mirror system may cause discomfort glare and visual disturbance of the driver during night driving.

The above information described in this background section is provided to assist in understanding the background of the inventive concept, and may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a vehicle side-view mirror system designed to visually and accurately provide a driver with information of an approaching vehicle through a display module and a lamp module.

According to an aspect of the present disclosure, a vehicle side-view mirror system may include: a side-view camera disposed on the exterior of a vehicle; and a display assembly mounted on an interior trim of a vehicle door. The display assembly may include a lamp module configured to be turned on when another vehicle approaching the vehicle is detected, and a display module configured to display an image captured by the side-view camera.

The display assembly may include a housing in which the lamp module and the display module are mounted. The lamp module may include an LED strip extending in a longitudinal direction of the housing. The LED strip may include an LED substrate extending in a strip shape, and a plurality of LEDS mounted on the LED substrate.

When another vehicle approaches the side or rear of the vehicle within a first distance during driving of the vehicle, LEDs that are located within a first length of the LED strip, among the plurality of LEDs, may be turned on, and the display module may display a first guide line indicating the first distance.

When another vehicle approaches the side and rear of the vehicle within a second distance during the driving of the vehicle, LEDs that are located within a second length of the LED strip, among the plurality of LEDs, may be turned on. The display module may display a second guide line indicating the second distance. The second distance may be less than the first distance, the second length may be greater than the first length, and the second guide line may be displayed below the first guide line.

When a turn signal is turned on to change a lane of the vehicle, and another vehicle approaches the side and rear of the vehicle within a second distance during the driving of the vehicle, all of the plurality of LEDs located within an entire length of the LED strip may be turned on, and the display module may display a second guide line indicating the second distance and display a blind-spot collision warning (BCW) image. The second distance may be less than the first distance, and the second guide line may be displayed below the first guide line.

When another vehicle approaches the side and rear of the vehicle within a third distance during the driving of the vehicle, LEDs that located within a third length of the LED strip, among the plurality of LEDs, may be turned on, and the display module may display a third guide line indicating the third distance. The third distance may be less than the second distance, the third length may be greater than the second length, and the third guide line may be displayed below the second guide line.

LEDS, among the plurality of LEDS, located within a predetermined length of the LED strip may be turned on based on proximity of the front or rear of the vehicle to an obstacle during parking of the vehicle.

LEDS, among the plurality of LEDS, located within a predetermined length of the LED strip may be turned on based on detection of another vehicle passing by the side of the vehicle which is parked.

The display assembly may further include an input mechanism configured to input instructions for controlling operation of the side-view camera, operation of the lamp module, and operation of the display module.

The vehicle side-view mirror system may further include: a lamp controller configured to control the lamp module; a main controller configured to control the display module; and an input mechanism controller configured to control the input mechanism. The main controller may be operably connected to the lamp controller and the input mechanism controller.

The vehicle side-view mirror system may further include an inside mirror disposed at a front upper portion of a passenger compartment of the vehicle. The inside mirror may include an infrared camera tracking and capturing a driver's facial motion.

The display module may be configured to vary its screen brightness based on data detected by the infrared camera.

The housing may include: a case configured to receive the lamp module, the display module, and the input mechanism; and a cover configured to cover the lamp module and the input mechanism. The cover may have an opening aligned with the display module.

The cover may include a semi-transmissive material.

BRIEF DESCRIPTION OF THE DRAWINGS

The above and other objects, features and advantages of the present disclosure should be more apparent from the following detailed description taken in conjunction with the accompanying drawings.

Figure 11:
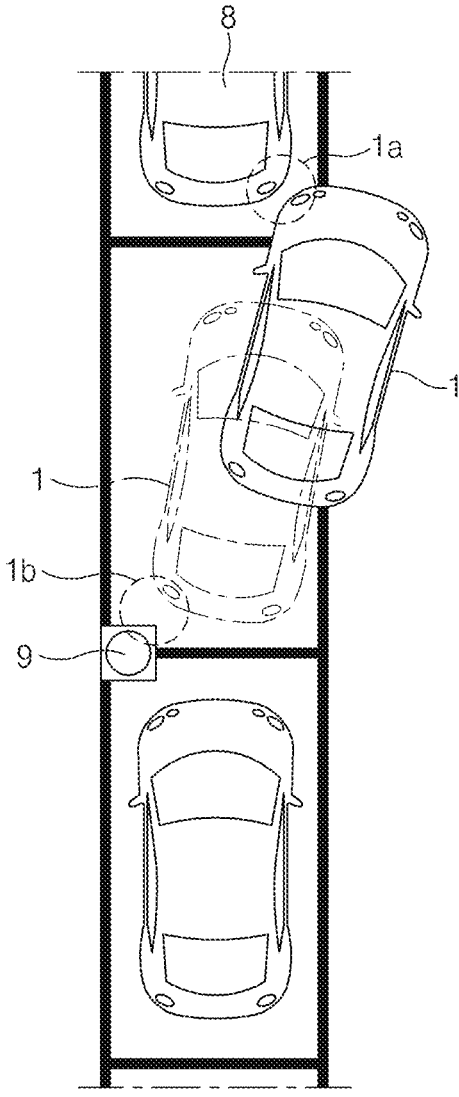
Figure 12:
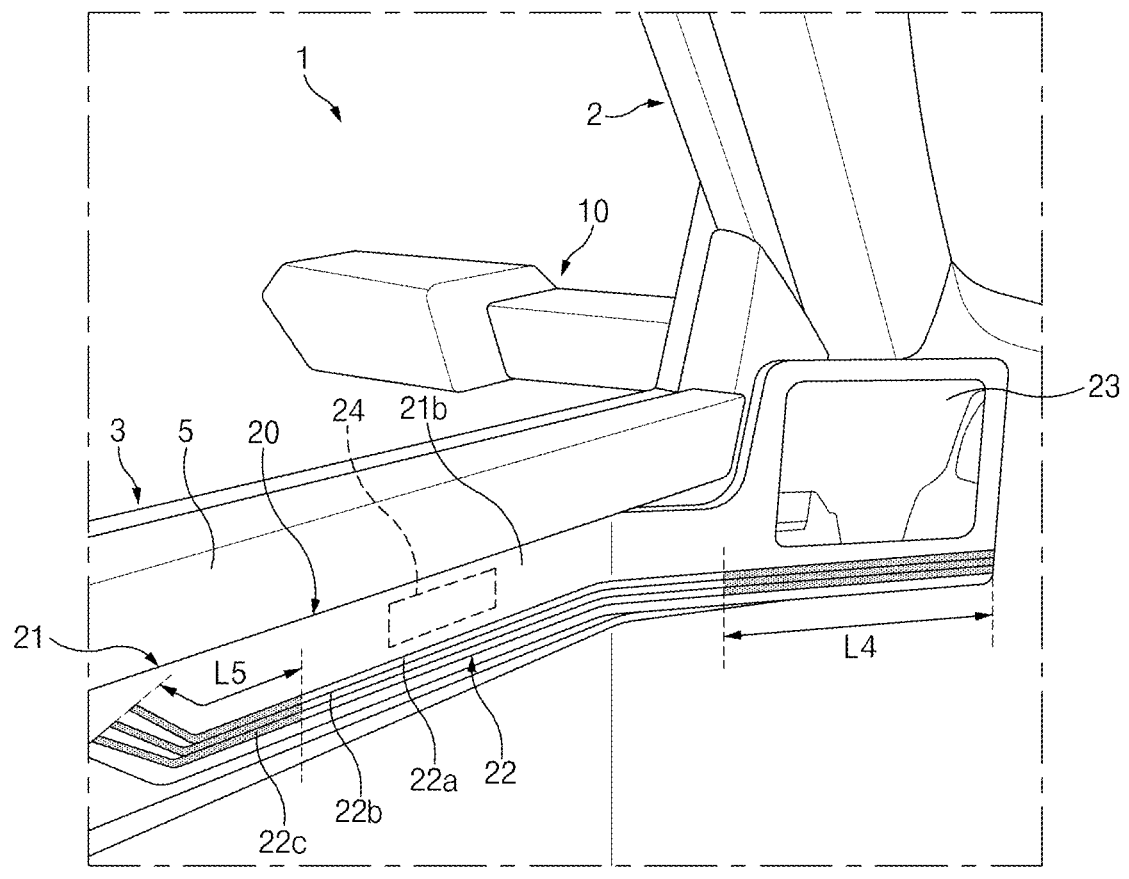
Figure 13:
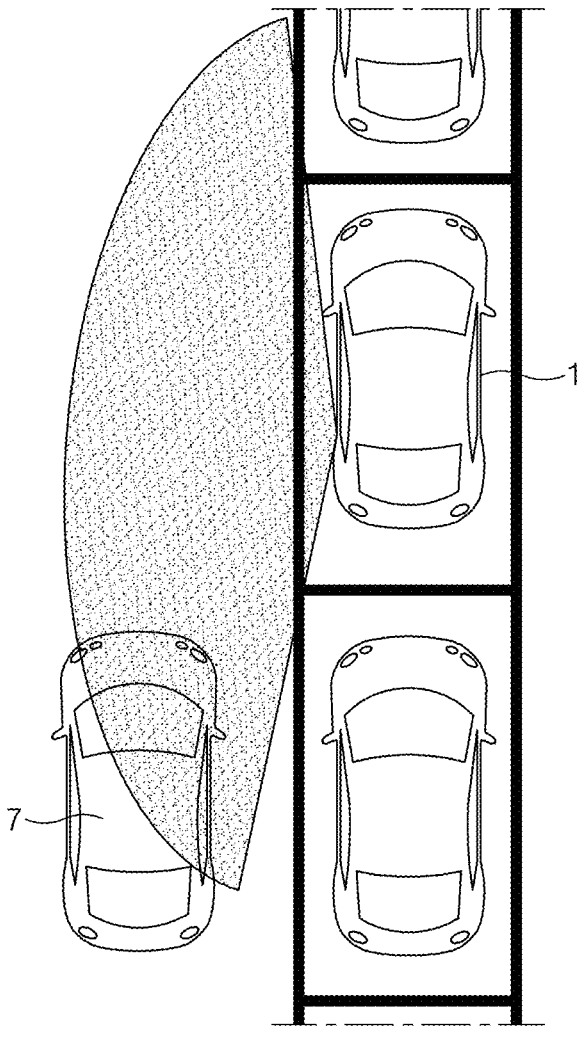

image in a vehicle side-view mirror system according to an embodiment of the present disclosure;

FIG. 11 illustrates a process of parking a vehicle;

FIG. 12 illustrates a state in which a portion of an LED strip of a lamp module is turned on in a vehicle side-view mirror system according to an embodiment of the present disclosure; and FIG. 13 illustrates a side exit assist (SEA) condition of detecting another vehicle passing by the side of a vehicle by a side-view camera and/or various sensors in a vehicle side-view mirror system according to an embodiment of the present disclosure.

DETAILED DESCRIPTION

Hereinafter, some embodiments of the present disclosure are described in detail with reference to the accompanying drawings. In the drawings, the same reference numerals are used throughout to designate the same or equivalent elements. In addition, a detailed description of well-known techniques associated with the present disclosure has been ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Figure 1:
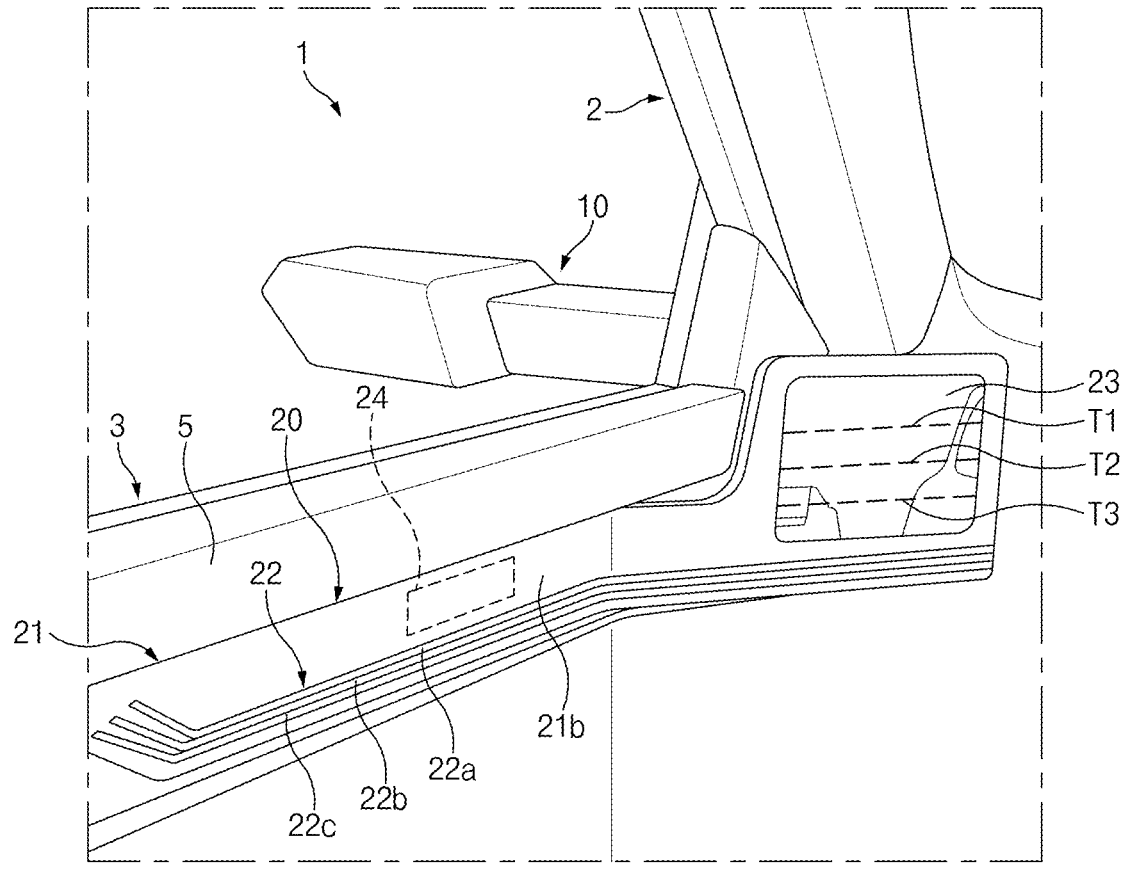
FIG. 1 illustrates a vehicle side-view mirror system according to an embodiment of the present disclosure.
Figure 2:
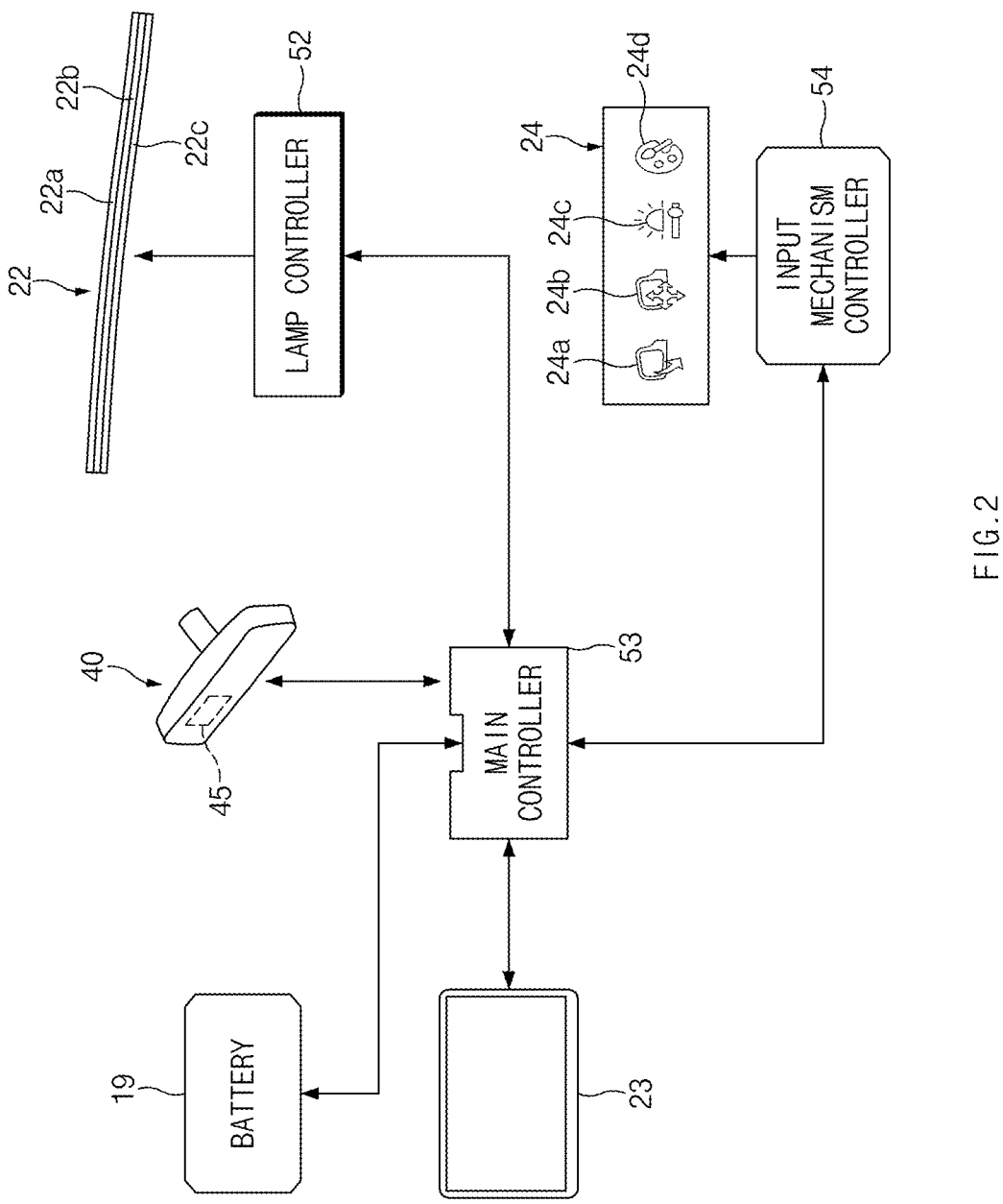
FIG. 2 illustrates a control block diagram of a vehicle side-view mirror system according to an embodiment of the present disclosure.

Referring to FIGS. 1-2, according to an embodiment of the present disclosure, a vehicle side-view mirror system may include: a side-view camera 10 disposed on the exterior of a vehicle 1, a display assembly 20 mounted on an interior trim 5 of a vehicle door 3, and an inside mirror 40 disposed at a front upper portion of a passenger compartment of the vehicle 1.

In one embodiment, a pair of side-view mirror systems may be disposed on both left and right sides of the vehicle 1, respectively, and the pair of side-view mirror systems may operate independently of each other. For example, the side-view mirror system adjacent to a driver's seat and the side-view mirror system adjacent to a front passenger seat may be configured to operate independently of each other.

Referring to FIG. 1, the side-view camera 10 may be disposed on the exterior of the vehicle 1. For example, the side-view camera 10 may be mounted on a pillar 2, the vehicle door 3, a fender, or the like. The side-view camera 10 disposed on the exterior of the vehicle 1 may be configured to photograph the side and rear of the vehicle in real time. Accordingly, the side-view camera 10 may capture the proximity of another vehicle, a person, an obstacle, and/or the like approaching the side and rear of the vehicle 1. In addition, the side-view camera 10 may be configured to move with respect to a vehicle body. For example, the side-view camera 10 may be stowed in or deployed from the exterior of the vehicle body, and be folded or unfolded with respect to the vehicle body in a state in which the side-view camera 10 is deployed from the vehicle body.

Referring to FIG. 1, the display assembly 20 may include a lamp module 22 configured to be turned on as another vehicle approaching the side and rear of the vehicle 1 is detected by the side-view camera 10 and/or other sensors. The display assembly 20 may also include: a display module 23 configured to display images of surroundings of the vehicle 1 that are captured by the side-view camera 10, and an input mechanism 24 configured to input various instructions for controlling the operation of the side-view camera 10, the operation of the lamp module 22, and the operation of the display module 23. According to an embodiment, the input mechanism 24 may be various input units such as a touch sensor and a touch panel. Referring to FIG. 2, a lamp controller 52 may be configured to control the lamp module 22, a main controller 53 may be configured to control the display module 23, and an input mechanism controller 54 may be configured to control the input mechanism 24. The main controller 53 may be electrically and operably connected to the side-view camera 10, the lamp controller 52, and the input mechanism controller 54. The main controller 53 may receive electric energy from a battery 19 of the vehicle. The main controller 53 may be configured to receive data (images, videos, etc.) on the surroundings of the vehicle 1 captured by the side-view camera 10. The main controller 53 may be configured to transmit and receive various control signals to and from an infrared camera 45 of the inside mirror 40, the lamp controller 52, and the input mechanism controller 54.

According to another embodiment, the lamp controller 52 and the input mechanism controller 54 may be removed, and the main controller 53 may be configured to control the display module 23, the lamp module 22, the input mechanism 24, and the side-view camera 10. The main controller 53 may be provided to the display module 23.

According to another embodiment, the main controller 53, the lamp controller 52, and the input mechanism controller 54 may be configured as an integrated controller, and the integrated controller may be provided to the display module 23.

The main controller 53 may be configured to control screen manipulation (pan/tilt, etc.) of the display module 23, change in brightness of the display module 23, display of a blind-spot collision warning (BCW) image, movement of the side-view camera 10, and the like.

The lamp controller 52 may be configured to control partial and sequential lighting, entire lighting on/off, and mood lighting of the lamp module 22 according to welcome scenario, vehicle proximity condition, side exit assist (SEA) condition, parking state, and the like.

The input mechanism controller 54 may be configured to control welcome screen, movement of the side-view camera 10, screen manipulation of the display module 23, brightness of the display module 23, lighting color of the lamp module 22, and the like.

Figure 3:
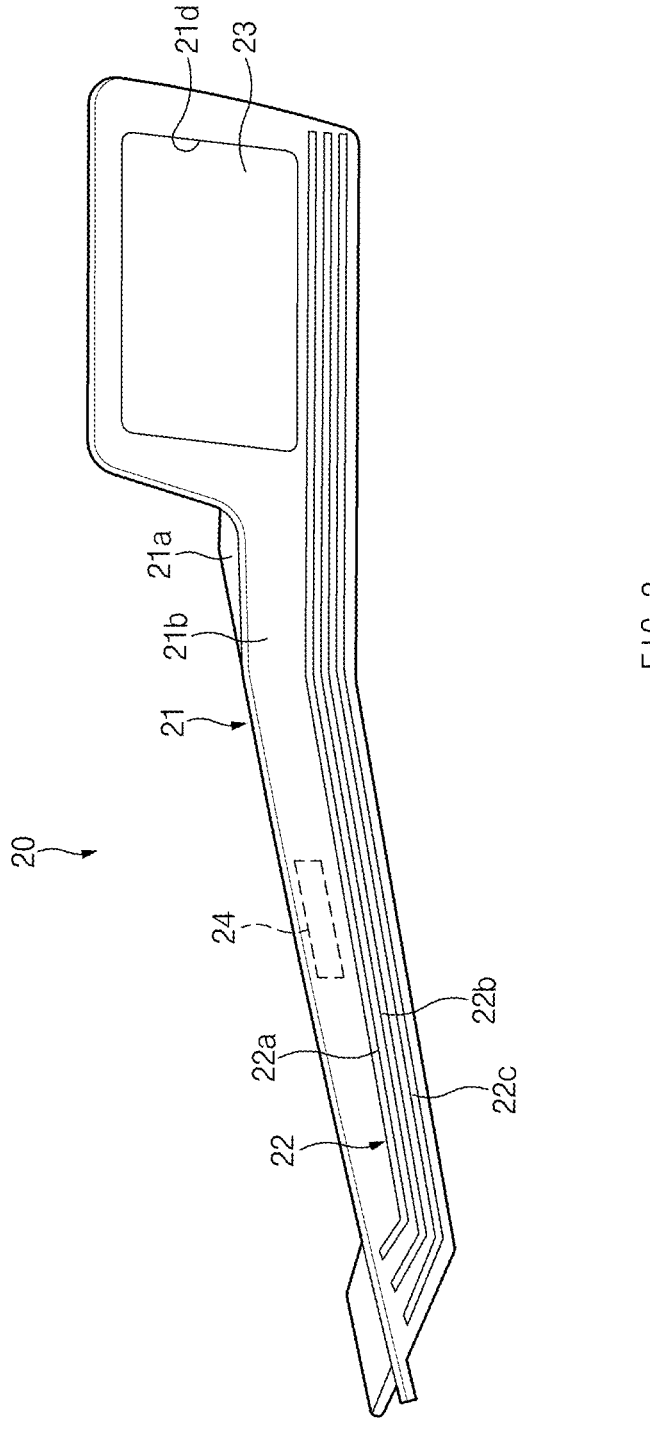
FIG. 3 illustrates a perspective view of a display assembly of a vehicle side-view mirror system according to an embodiment of the present disclosure.

Referring to FIG. 3, the display assembly 20 may include a housing 21 in which the lamp module 22, the display module 23, and the input mechanism 24 are mounted. The housing 21 may be mounted on the interior trim 5 of the vehicle door 3, and the housing 21 may extend in a longitudinal direction of the vehicle on the interior trim 5 of the vehicle door 3.

Figure 4:
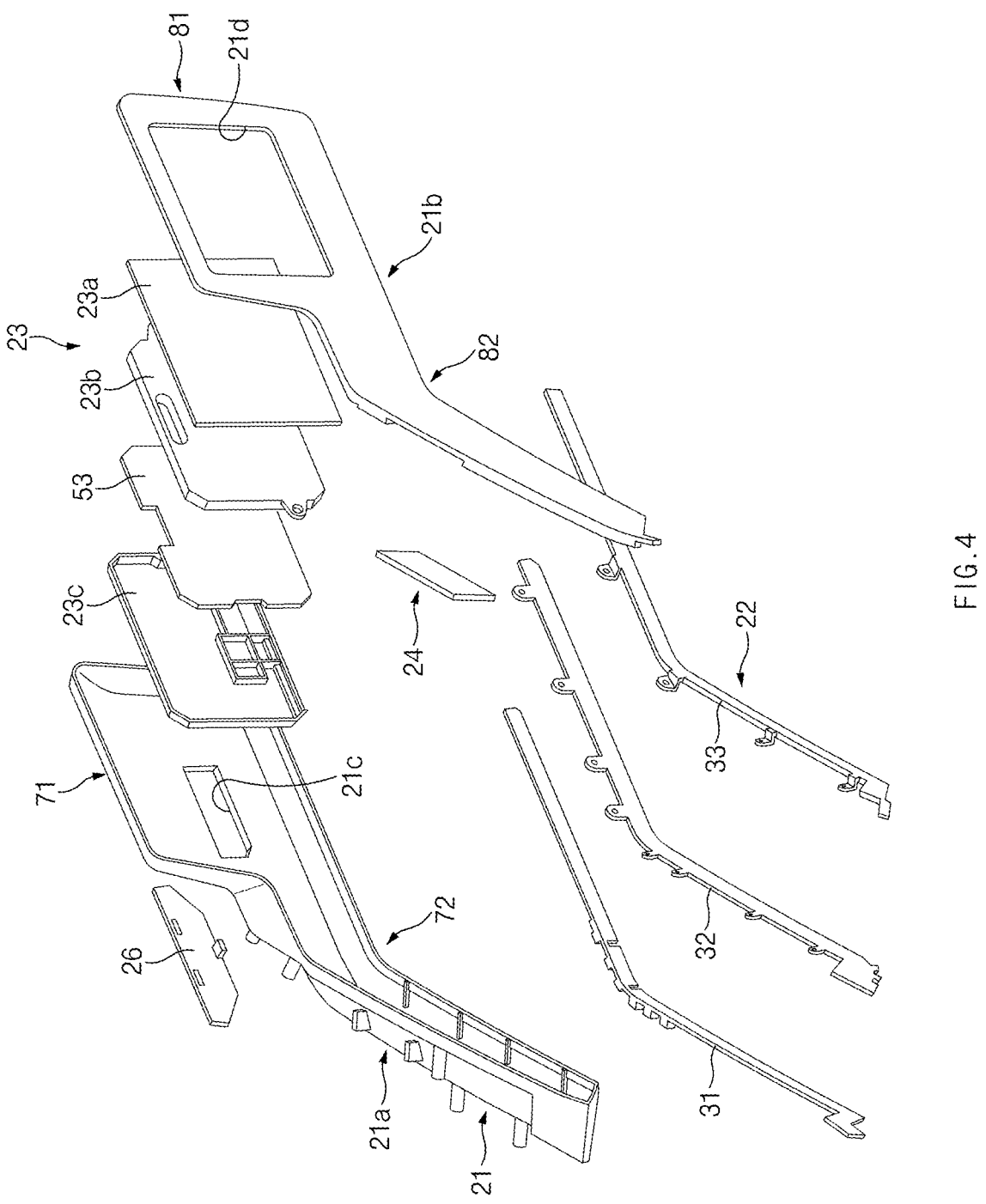
FIG. 4 illustrates an exploded perspective view of a display assembly of a vehicle side-view mirror system according to an embodiment of the present disclosure.

Referring to FIG. 4, the housing 21 may include a case 21a configured to receive the lamp module 22, the display module 23, and the input mechanism 24, and a cover 21b configured to cover the case 21a. The lamp module 22, the display module 23, and the input mechanism 24 may be received in a cavity of the case 21a, and the cover 21b may be mounted on the case 21a to cover the lamp module 22 and the input mechanism 24.

Referring to FIG. 1, the housing 21 may extend in the longitudinal direction of the vehicle from the pillar 2 toward the rear of the vehicle. The housing 21 may include a front end facing the front of the vehicle, and a rear end facing the rear of the vehicle. The display module 23 may be located adjacent to the front end of the housing 21, the front end of the housing 21 may be adjacent to the pillar 2, and the display module 23 may be adjacent to the pillar 2. The lamp module 22 may extend in a longitudinal direction of the housing 21 from the front end of the housing 21 toward the rear end of the housing 21 below the display module 23.

Referring to FIG. 4, the case 21a may include a first portion 71 receiving the display module 23, and a second portion 72 receiving the lamp module 22 and the input mechanism 24. The first portion 71 may have a rectangular shape, and the second portion 72 may have a strip shape. The second portion 72 may extend from the first portion 71 to a predetermined length. The second portion 72 may be bent to match the shape of the interior trim 5 of the vehicle door 3. The case 21a may have an opening 21c formed in the first portion 71, and a cap 26 may close the opening 21c. For example, the case 21a and the cap 26 may be made of a synthetic resin material such as ABS (acrylonitrile butadiene styrene copolymer).

Referring to FIG. 4, the cover 21b may include a first portion 81 covering the first portion 71 of the case 21a, and a second portion 82 covering the second portion 72 of the case 21a. The first portion 81 may have a rectangular shape corresponding to the shape of the first portion 71 of the case 21a, and the second portion 82 may have a strip shape corresponding to the shape of the second portion 72 of the case 21a. The cover 21b may have an opening 21d formed in the first portion 81, and the display panel 23a of the display module 23 may be aligned with the opening 21d. For example, the cover 21b may be made of a synthetic resin material such as bio polycarbonate.

According to an embodiment, the cover 21b may include a semi-transmissive material. As the cover 21b is made of a semi-transmissive material, light emitted from the lamp module 22 and the input mechanism 24 may be transmitted to the outside through the cover 21b, and a shy tech function may be provided so that the lamp module 22 and the input mechanism 24 may be invisible when the lamp module 22 and the input mechanism 24 do not operate.

The lamp module 22 may be configured to perform partial and sequential lighting of each of LED strips 22a, 22b, and 22c, mood lighting, a dimming function to adjust the intensity of light, brightness adjustment for day/night, and the like. The lamp module 22 may be configured to be turned on and off in various ways by the main controller 53 and the lamp controller 52 based on the data on the surroundings of the vehicle 1 captured by the side-view camera 10. The lamp module 22 may be configured to be partially and sequentially turned on in various colors and to various lengths or be entirely turned off based on the images captured by the side-view camera 10. The lamp module 22 may include at least one LED strip, and at least one LED strip may extend in the longitudinal direction of the housing 21. Referring to FIGS. 1 to 3, three LED strips 22a, 22b, and 22c may extend in the longitudinal direction of the housing 21.

Referring to FIG. 4, the lamp module 22 may be received in a lower portion of the first portion 71 and the second portion 72 of the case 21a, and the lamp module 22 may be covered with a lower portion of the first portion 81 and the second portion 82 of the cover 21b.

Referring to FIG. 4, the lamp module 22 may include an LED substrate 31, a collimator 32 allowing incident light from the LED substrate 31 to be in parallel, and a diffusion sheet 33 diffusing light received from the collimator 32. For example, the collimator 32 may be made of poly methyl methacrylate (PMMA), and the diffusion sheet 33 may be made of polycarbonate. The LED substrate 31, the collimator 32, and the diffusion sheet 33 may extend in the longitudinal direction of the housing 21. As the LED substrate 31, the collimator 32, and the diffusion sheet 33 extend in the longitudinal direction of the housing 21, they may form at least one of the LED strips 22a, 22b, and 22c. The lamp controller 52 may be integrally provided with the LED substrate 31, and each of the LED strips 22a, 22b, and 22c may be configured to be turned on to a predetermined length thereof by the lamp controller 52.

Figure 5:
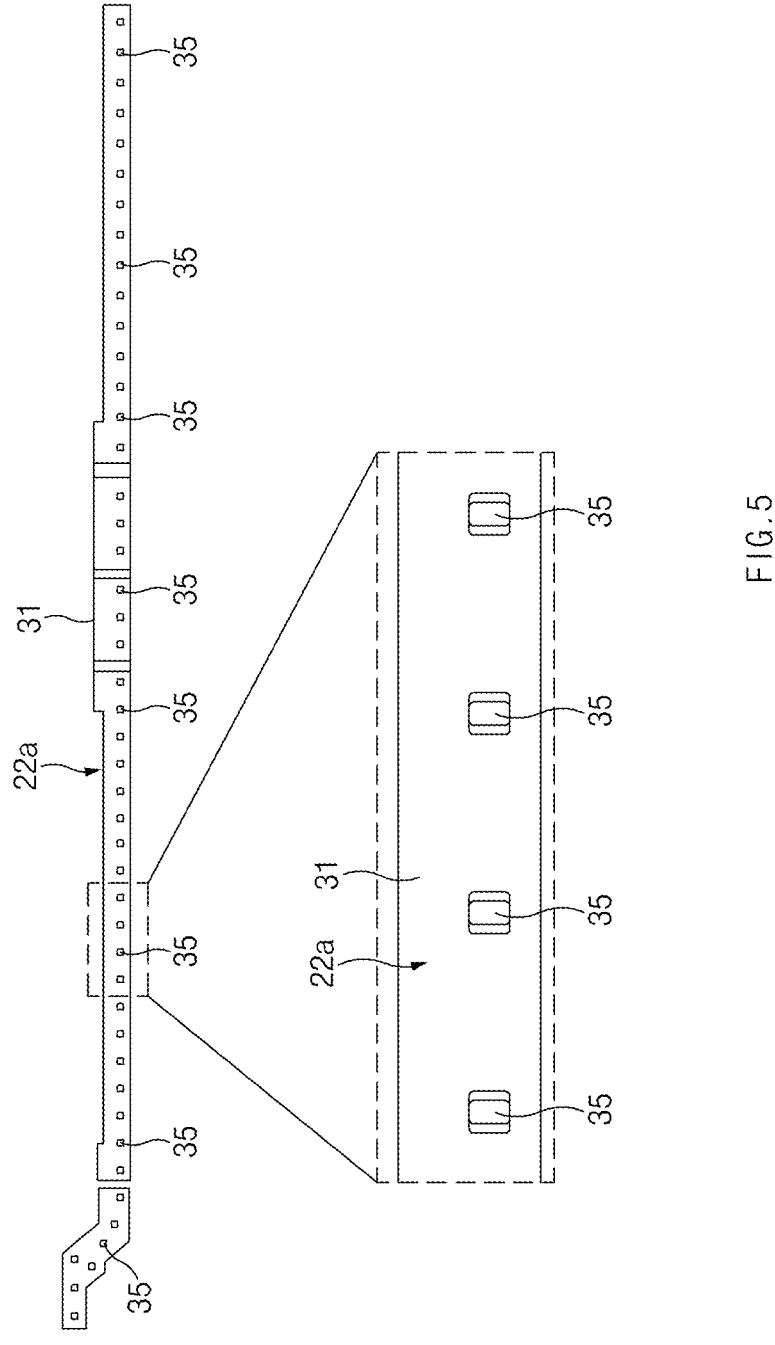
FIG. 5 illustrates an LED strip of a lamp module of a vehicle side-view mirror system according to an embodiment of the present disclosure.

Referring to FIG. 5, each of the LED strips 22a, 22b, and 22c may include the LED substrate 31 extending in a strip shape, and a plurality of LEDs 35 mounted on the LED substrate 31. The plurality of LEDs 35 may be arrayed in a line in a longitudinal direction of the LED substrate 31 to thereby form one LED strip 22a.

The display module 23 may be configured to display the surroundings of the vehicle 1 photographed by the side-view camera 10. Referring to FIG. 4, the display module 23 may include a display panel 23a configured to display the images of the surroundings of the vehicle 1 captured by the side-view camera 10. A first heat sink 23b may be spaced apart from a back face of the display panel 23a, the first heat sink 23b may contact a front face of the main controller 53, and a second heat sink 23c may contact a back face of the main controller 53. Accordingly, the first heat sink 23b and the second heat sink 23c may have the main controller 53 sandwiched therebetween. The first heat sink 23b and the second heat sink 23c may be configured to cool the main controller 53. The main controller 53 may be configured to control the operation of the display panel 23a and the operation of the side-view camera 10. For example, the display panel 23a may be an OLED panel or the like, and the first heat sink 23b and the second heat sink 23c may be made of an aluminum die-casting (ALDC) material.

Referring to FIG. 4, the display module 23 may be received in the first portion 71 of the case 21a, and the display panel 23a of the display module 23 may be aligned with the opening 21d of the cover 21b.

Referring to FIG. 2, the input mechanism 24 may have a plurality of icons 24a, 24b, 24c, and 24d for controlling the operation of the side-view camera 10, the operation of the lamp module 22, and the operation of the display module 23. The plurality of icons 24a, 24b, 24c, and 24d may include: a first icon 24a for controlling the movement of the side-view camera 10; a second icon 24b for controlling the pan/tilt of the display panel 23a (e.g., adjusting, rotating or moving the display panel horizontally (side to side) and vertically (up and down)); a third icon 24c for controlling the brightness of the display panel 23a, and a fourth icon 24d for changing the lighting color of the lamp module 22. The input mechanism 24 may be controlled by the input mechanism controller 54, and the input mechanism controller 54 may be integrally provided with the input mechanism 24. For example, the input mechanism 24 may be a touch panel having a haptic function.

Referring to FIG. 4, the input mechanism 24 may be received in the second portion 72 of the case 21a, and the input mechanism 24 may be covered with the second portion 82 of the cover 21b.

The inside mirror 40 may be disposed at the front upper portion of the passenger compartment of the vehicle. For example, the inside mirror 40 may be mounted on a front portion of a roof of the vehicle.

Figure 6:
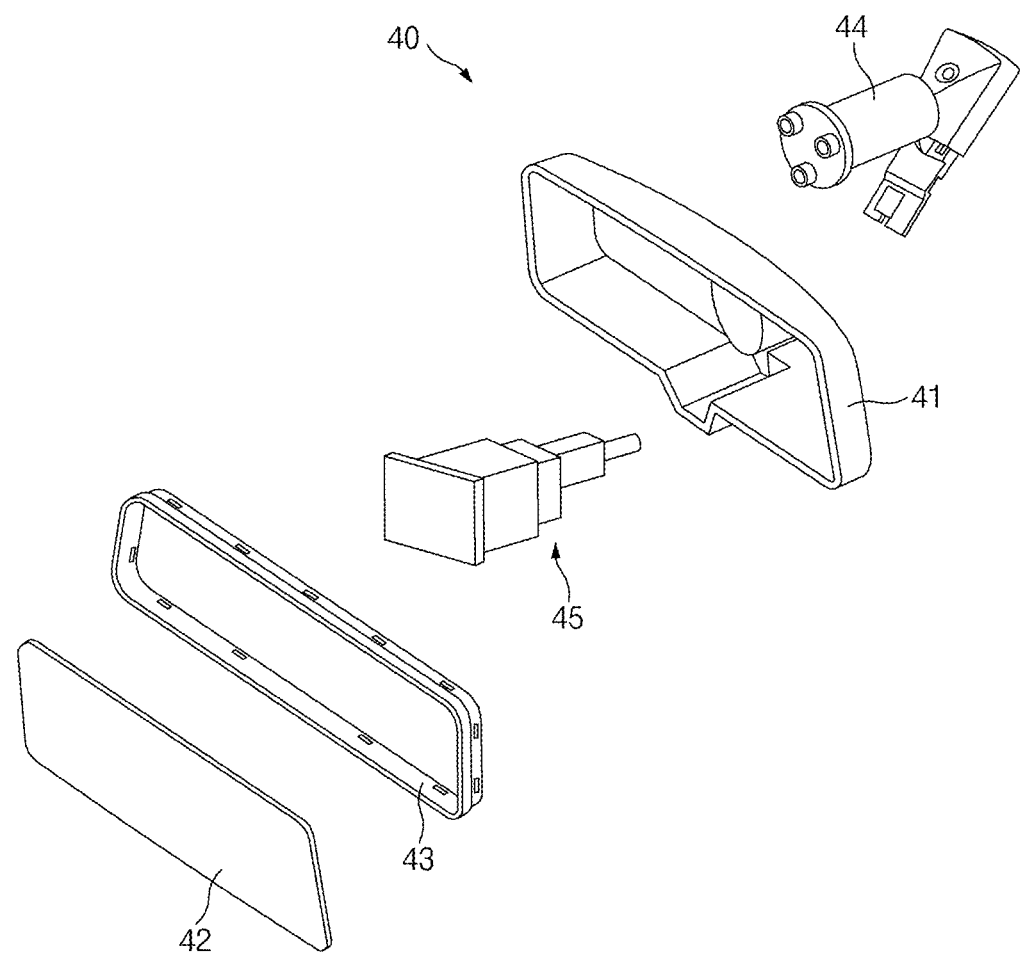
FIG. 6 illustrates an exploded perspective view of an inside mirror of a vehicle side-view mirror system according to an embodiment of the present disclosure.

Referring to FIG. 6, the inside mirror 40 may include a mirror housing 41, a mirror 42 mounted on a front face of the mirror housing 41, a bezel 43 fixing and sealing edges of the mirror 42, a mounting bracket 44 fixed to a back face of the mirror housing 41, and the infrared camera 45 received in the mirror housing 41. For example, the mirror housing 41 and the bezel 43 may be made of a synthetic resin material such as ABS (acrylonitrile butadiene styrene copolymer).

The infrared camera 45 may be electrically and operably connected to the main controller 53. The infrared camera 45 may detect a gaze angle of the driver by tracking the driver's facial motion. Specifically, the infrared camera 45 may extract the driver's facial image, detect the driver's facial features from the extracted driver's facial image, track the detected driver's facial features, and detect the gaze angle of the driver. Accordingly, the infrared camera 45 may detect whether the driver is looking at the display module 23 or looking ahead of the vehicle. The display module 23 may vary its screen brightness by the main controller 53 based on the data detected by the infrared camera 45. For example, when it is detected by the infrared camera 45 that the driver is looking at the display module 23, the main controller 53 may increase the brightness of the display panel 23a of the display module 23. When it is detected by the infrared camera 45 that the driver is not looking at the display module 23, the main controller 53 may reduce the brightness of the display panel 23a of the display module 23. Accordingly, the driver's glare and eye fatigue may be avoided or prevented during night driving.

The side-view mirror system according to an embodiment of the present disclosure may be configured to turn on each of the LED strips 22a, 22b, and 22c of the lamp module 22 to a predetermined length by the lamp controller 52 depending on a distance to another vehicle approaching the side and rear of the vehicle 1 while the vehicle 1 is driving.

Figure 7:
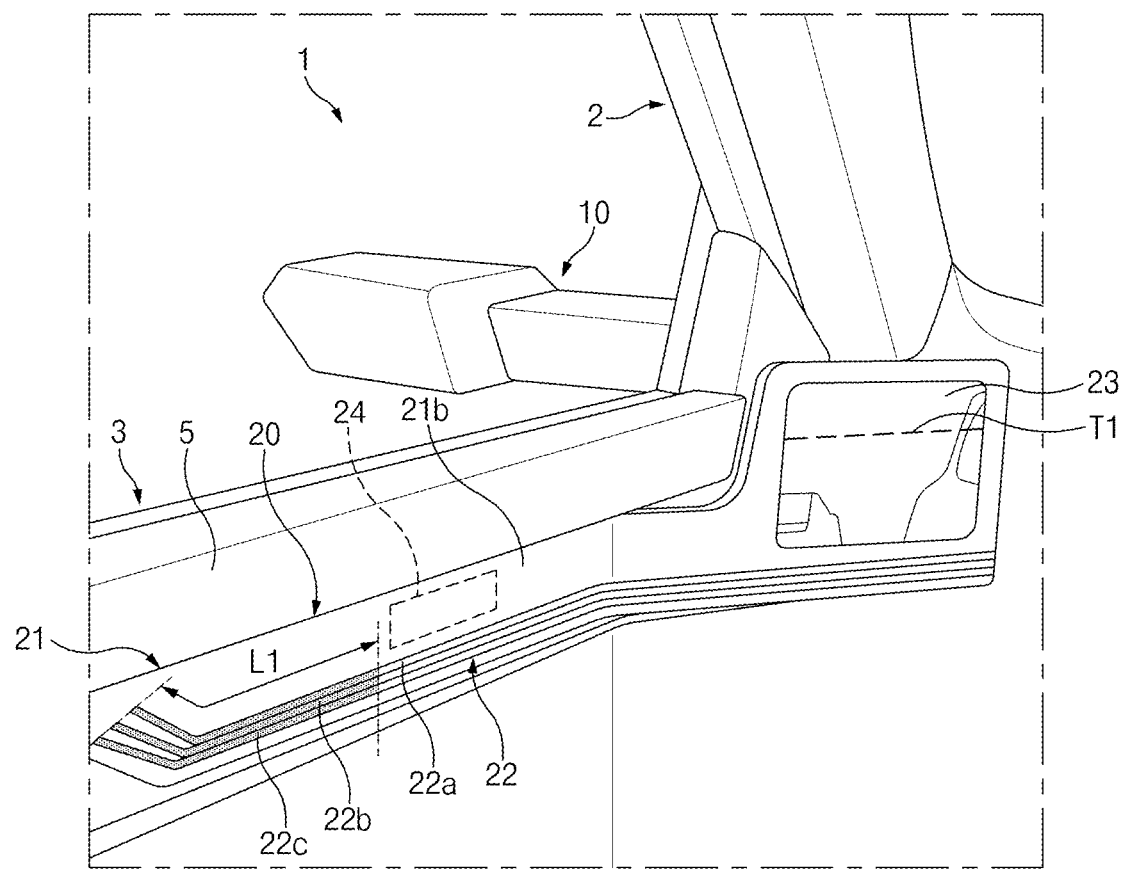
FIG. 7 illustrates a state in which an LED strip of a lamp module is turned on from a rear end thereof to a first length in a vehicle side-view mirror system according to an embodiment of the present disclosure.

Referring to FIG. 7, when another vehicle approaches the side and rear of the vehicle 1 within a first distance (for example, 12 m), the LEDs 35 located within a first length L1 from a rear end of each of the LED strips 22a, 22b, and 22c may be turned on sequentially or simultaneously by the main controller 53 or the lamp controller 52 so that each of the LED strips 22a, 22b, and 22c may be turned on from the rear end thereof to the first length L for a predetermined period of time, and the display module 23 may display a first guide line T1 indicating the first distance on the screen. The first guide line T1 may extend horizontally on the screen of the display module 23.

Figure 8:
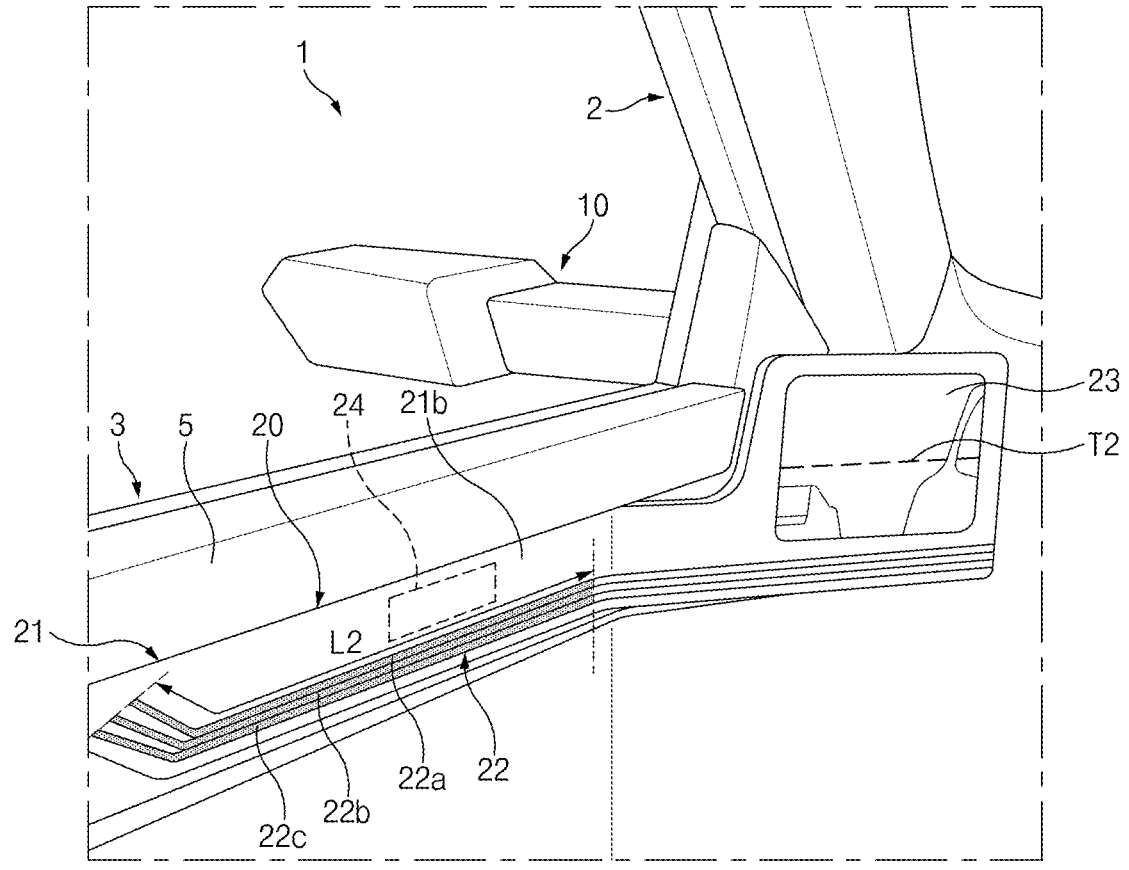
FIG. 8 illustrates a state in which an LED strip of a lamp module is turned on from a rear end thereof to a second length in a vehicle side-view mirror system according to an embodiment of the present disclosure.

Referring to FIG. 8, when another vehicle approaches the side and rear of the vehicle 1 within a second distance (for example, 8 m), the LEDs 35 located within a second length L2 from the rear end of each of the LED strips 22a, 22b, and 22c may be turned on sequentially or simultaneously by the main controller 53 or the lamp controller 52 so that each of the LED strips 22a, 22b, and 22c may be turned on from the rear end thereof to the second length L2 for a predetermined period of time, and the display module 23 may display a second guide line T2 indicating the second distance on the screen. The second distance may be less than the first distance, and the second length L2 may be greater than the first length L1. The second guide line T2 may be displayed below the first guide line T1 on the screen of the display module 23. The second guide line T2 may extend horizontally to be parallel to the first guide line T1.

Figure 9:
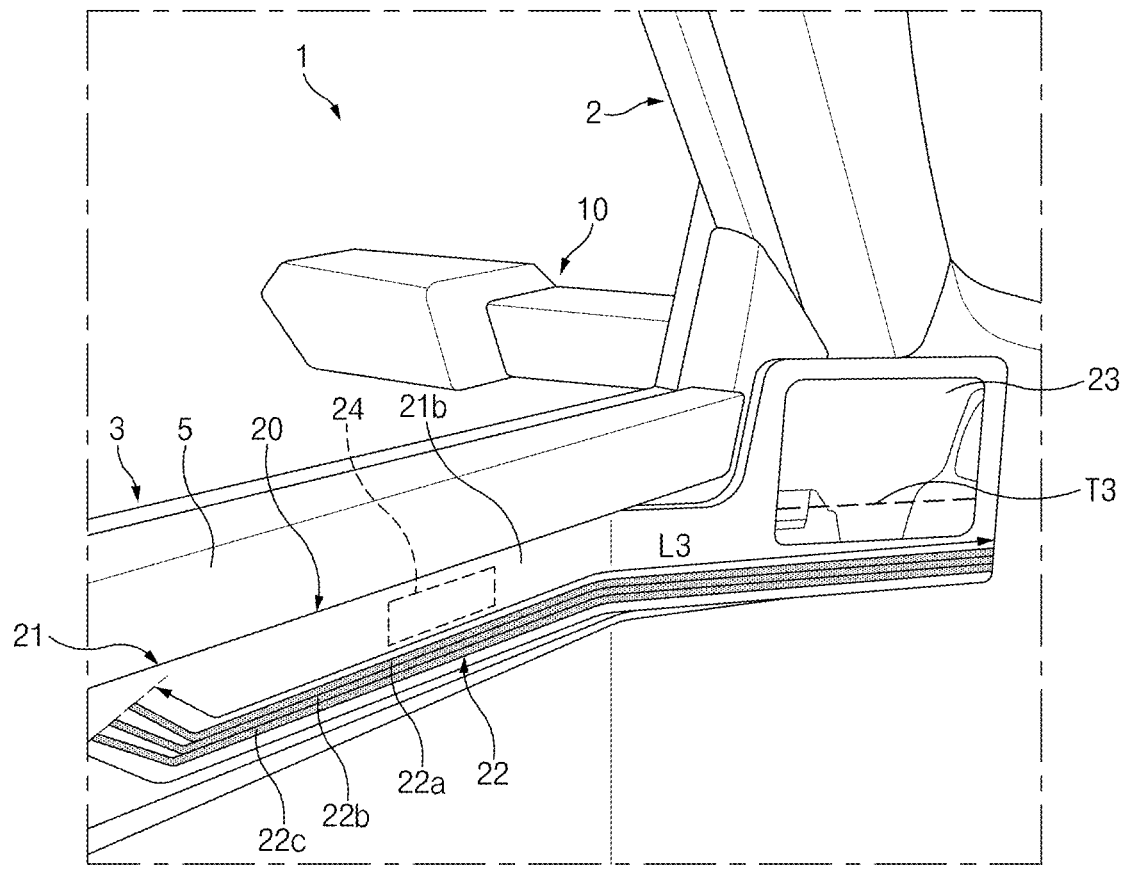
FIG. 9 illustrates a state in which an LED strip of a lamp module is turned on from a rear end thereof to a third length in a vehicle side-view mirror system according to an embodiment of the present disclosure.

Referring to FIG. 9, when another vehicle approaches the side and rear of the vehicle 1 within a third distance (for example, 3 m), the LEDs 35 located within a third length L3 from the rear end of each of the LED strips 22*a*, 22*b*, and 22*c* may be turned on sequentially or simultaneously by the main controller 53 or the lamp controller 52 so that each of the LED strips 22*a*, 22*b*, and 22*c* may be turned on from the rear end thereof to the third length L3 for a predetermined period of time, and the display module 23 may display a third guide line T3 indicating the third distance on the screen. The third distance may be less than the second distance, and the third length L3 may be greater than the second length L2. For example, the third length L3 may be equal to the entire length of each of the LED strips 22*a*, 22*b*, and 22*c*. The third guide line T3 may be displayed below the second guide line T2 on the screen of the display module 23. The third guide line T3 may extend horizontally to be parallel to the second guide line T2.

Figure 10:
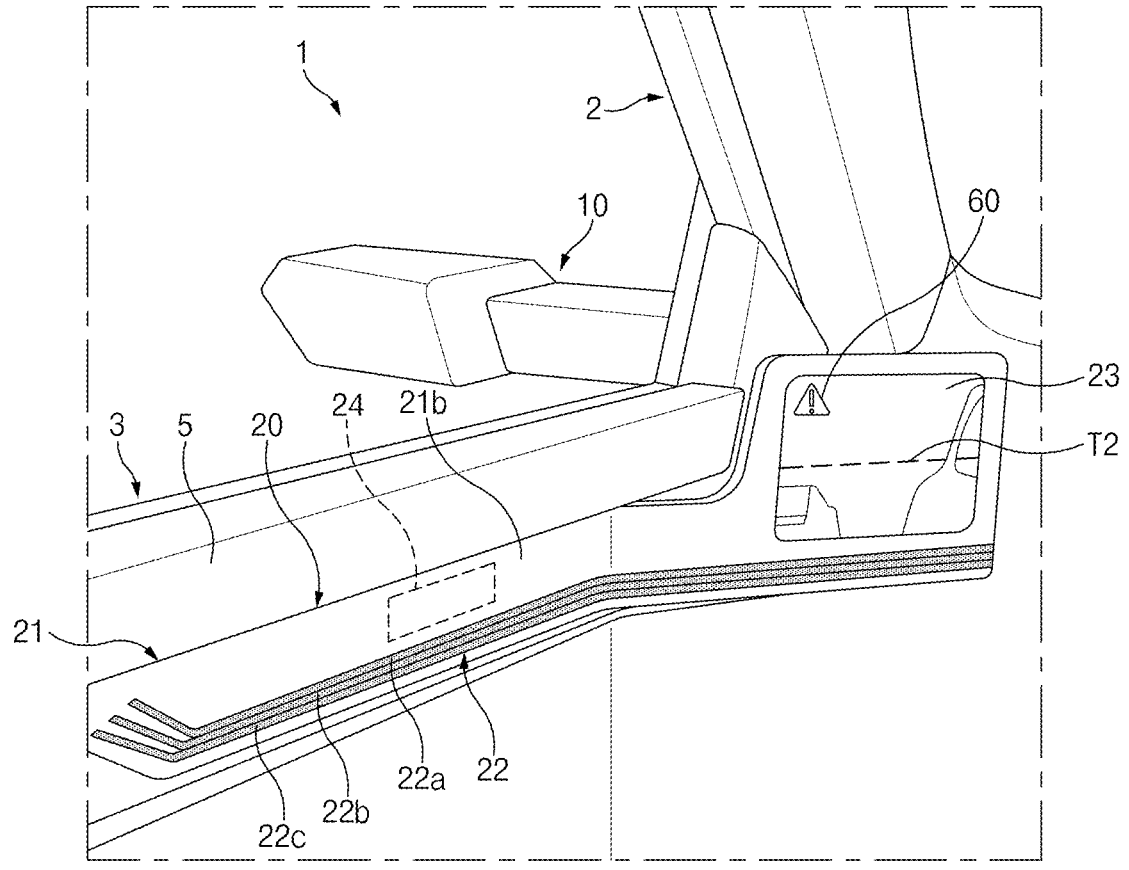
FIG. 10 illustrates a state in which an LED strip of a lamp module is turned on to the entire length thereof and a display module displays a blind-spot collision warning (BCW)

Referring to FIG. 10, when a turn signal is turned on to change the lane of the vehicle 1, and another vehicle approaches the side and rear of the vehicle 1 within the second distance (for example, 8 m), all the LEDs 35 of each of the LED strips 22*a*, 22*b*, and 22*c* may be turned on sequentially or simultaneously by the main controller 53 or the lamp controller 52 so that each of the LED strips 22*a*, 22*b*, and 22*c* may be turned on to the entire length thereof for a predetermined period of time, and the display module 23 may display the second guide line T2 indicating the second distance and a blind-spot collision warning (BCW) image 60 on the screen. According to an embodiment, the BCW image 60 or a BCW indicator may flash at one corner of the display module 23.

Referring to FIG. 11, when the driver operates a reverse gear to park the vehicle 1, various sensors may detect proximity 1*a* of the front of the vehicle 1 to an obstacle 8 such as another vehicle, and detect proximity 1*b* of the rear of the vehicle 1 to an obstacle 9. During the parking of the vehicle 1, the LEDs 35 located within a predetermined length of each of the LED strips 22*a*, 22*b*, and 22*c* may be turned on in red sequentially or simultaneously by the lamp controller 52 or the main controller 53 based on the detection of the proximity of the vehicle 1 to the obstacles 8 and 9 so that each of the strips 22*a*, 22*b*, and 22*c* may be turned on in red to a predetermined length. When the proximity 1*a* of the front of the vehicle 1 to the obstacle 8 is detected during the parking of the vehicle 1, the LEDs 35 located within a predetermined length L4 from a front end of each of the LED strips 22*a*, 22*b*, and 22*c* may be turned on in red sequentially or simultaneously by the lamp controller 52 or the main controller 53 as illustrated in FIG. 12 so that each of the LED strips 22*a*, 22*b*, and 22*c* may be turned on in red from the front end thereof to the predetermined length L4. In addition, when the proximity 1*b* of the rear of the vehicle 1 to the obstacle 9 is detected during the parking of the vehicle 1, the LEDs 35 located within a predetermined length L5 from the rear end of each of the LED strips 22*a*, 22*b*, and 22*c* may be turned on in red sequentially or simultaneously by the lamp controller 52 or the main controller 53 as illustrated in FIG. 12 so that each of the LED strips 22*a*, 22*b*, and 22*c* may be turned on in red from the rear end thereof to the predetermined length L5. Then, when the driver operates the vehicle in parking mode or drives forward at a speed of 10 km/h or higher, each of the LED strips 22*a*, 22*b*, and 22*c* of the lamp module 22 may be turned off by the lamp controller 52 or the main controller 53.

FIG. 13 illustrates a side exit assist (SEA) condition of detecting another vehicle 7 passing by the side of the vehicle 1 by the side-view camera 10 and/or various sensors when the driver or an occupant wants to get out of the parked vehicle 1. In the SEA condition, each of the LED strips 22*a*, 22*b*, and 22*c* of the lamp module 22 may be turned on in red to the entire length thereof for a predetermined period of time by the lamp controller 52.

As set forth above, the vehicle side-view mirror system according to the embodiments of the present disclosure may be designed to visually and accurately provide the driver with the approach of another vehicle through the display module and the lamp module, thereby improving driving safety and more accurately perceiving the distance to another vehicle.

According to the embodiments of the present disclosure, the display module and the lamp module may visually provide changes in the surroundings of the vehicle in real time, allowing the driver to perform lane changes, parking, and the like more safely. In particular, the display module and the lamp module may provide warnings and alerts to the driver, thereby contributing to the prevention of accidents or collisions.

According to embodiments of the present disclosure, the distance to another vehicle approaching the side and rear of the vehicle may be more accurately provided through sequential or simultaneous lighting of the LED strips of the lamp module so that the driver may obtain safety during night driving, blind-spot collision warnings, the distance to another vehicle, an obstacle, and/or the like during driving and during parking, the speed of the following vehicle, and the like.

Hereinabove, although the present disclosure has been described with reference to the embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A vehicle side-view mirror system, comprising:
   a side-view camera disposed on an exterior of a vehicle; and
   a display assembly mounted on an interior trim of a vehicle door,
   wherein the display assembly includes a lamp module configured to be turned on when another vehicle approaching the vehicle is detected, and a display module configured to display an image captured by the side-view camera,
   wherein the display assembly comprises:
      a case configured to receive the lamp module and the display module;
      a main controller configured to control the display module;
      a first heat sink contacting a front face of the main controller and configured to cool the main controller;
      a second heat sink contacting a back face of the main controller and configured to cool the main controller; and a cover configured to cover the lamp module, wherein the cover has an opening aligned with the display module, and the cover includes a semi-transmissive material.

2. The vehicle side-view mirror system according to claim 1, wherein:

the lamp module includes an LED strip extending in a longitudinal direction of the cover, and the LED strip includes an LED substrate extending in a strip shape, and a plurality of LEDS mounted on the LED substrate.

3. The vehicle side-view mirror system according to claim 2, wherein:

when the another vehicle approaches a side or rear of the vehicle within a first distance during driving of the vehicle, LEDs that are located within a first length of the LED strip, among the plurality of LEDs, are turned on; and the display module is configured to display a first guide line indicating the first distance.

4. The vehicle side-view mirror system according to claim 3, wherein: when the another vehicle approaches the side and rear of the vehicle within a second distance during the driving of the vehicle, LEDs that are located within a second length of the LED strip, among the plurality of LEDs, are turned on;

the display module is configured to display a second guide line indicating the second distance;

the second distance is less than the first distance;

the second length is greater than the first length; and the second guide line is displayed below the first guide line.

5. The vehicle side-view mirror system according to claim 3, wherein when a turn signal is turned on to change a lane of the vehicle, and the another vehicle approaches the side and rear of the vehicle within a second distance during the driving of the vehicle, all of the plurality of LEDs located within an entire length of the LED strip are turned on;

the display module is configured to display a second guide line indicating the second distance and display a blind-spot collision warning (BCW) image;

the second distance is less than the first distance; and the second guide line is displayed below the first guide line.

6. The vehicle side-view mirror system according to claim 4, wherein: when the another vehicle approaches the side and rear of the vehicle within a third distance during the driving of the vehicle, LEDs that are located within a third length of the LED strip, among the plurality of LEDs, are turned on;

the display module is configured to display a third guide line indicating the third distance;

the third distance is less than the second distance;

the third length is greater than the second length; and the third guide line is displayed below the second guide line.

7. The vehicle side-view mirror system according to claim 2, wherein among the plurality of LEDs, LEDs located within a predetermined length of the LED strip are turned on based on proximity of a front or rear of the vehicle to an obstacle during parking of the vehicle.

8. The vehicle side-view mirror system according to claim 2, wherein among the plurality of LEDs, LEDs located within a predetermined length of the LED strip are turned on based on detection of another vehicle passing by the side of the vehicle which is parked.

9. The vehicle side-view mirror system according to claim 2, wherein the display assembly further includes an input mechanism configured to input instructions for controlling operation of the side-view camera, operation of the lamp module, and operation of the display module.

10. The vehicle side-view mirror system according to claim 9, further comprising:

a lamp controller configured to control the lamp module; and an input mechanism controller configured to control the input mechanism, wherein the main controller is operably connected to the lamp controller and the input mechanism controller.

11. The vehicle side-view mirror system according to claim 1, further comprising an inside mirror disposed at a front upper portion of a passenger compartment of the vehicle, wherein the inside mirror includes an infrared camera configured to track and capture a facial motion of a driver of the vehicle.

12. The vehicle side-view mirror system according to claim 11, wherein the display module is configured to vary its screen brightness based on data detected by the infrared camera.

\* \* \* \* \*